United States Patent [19]

Kato et al.

[11] 4,156,563
[45] May 29, 1979

[54] AUTOMATIC FOCUS ADJUSTING DEVICE

[75] Inventors: Motohiko Kato, Higashikurume; Noriaki Osawa, Tachikawa, both of Japan

[73] Assignee: Nihon Beru-Haueru Kabuskiki Kaisha, Higashimurayama, Japan

[21] Appl. No.: 874,587

[22] Filed: Feb. 2, 1978

[30] Foreign Application Priority Data

Feb. 3, 1977 [JP] Japan .................. 52-010244

[51] Int. Cl.$^2$ ............... G03B 3/10; G01J 1/20
[52] U.S. Cl. .................... 354/25; 352/140; 250/201
[58] Field of Search ........ 354/25, 31, 60 R; 352/140; 250/201, 204, 214 P

[56] References Cited

U.S. PATENT DOCUMENTS

| | | | |
|---|---|---|---|
| 3,958,117 | 5/1976 | Stauffer | 250/201 |
| 4,002,899 | 1/1977 | Stauffer | 250/201 |
| 4,045,805 | 8/1977 | Saito | 354/25 |

*Primary Examiner*—L. T. Hix
*Assistant Examiner*—William B. Perkey
*Attorney, Agent, or Firm*—Aaron Passman; Kirk M. McInerney

[57] ABSTRACT

Disclosed is an improvement in an automatic focusing system for use with an optical instrument having a focusable objective which is adjustable in response to optical and electronic components of the system for determining object distance of a remote subject by comparing images of scanning and reference optical systems. The scanner of the optical system is driven oscillatably across an angle to detect a subject between infinity and the minimum focus condition of the objective lens. The present invention relates to improvements in an automatic focusing system for use with an optical instrument having a focusable objective. More particularly, the improvement relates to driving the focusing system to a preset fixed focus setting when the system senses difficult conditions for focus detection as those having low contrast or complex subject matter.

4 Claims, 3 Drawing Figures

1

AUTOMATIC FOCUS ADJUSTING DEVICE

BACKGROUND OF THE INVENTION

This invention relates to an automatic focus adjusting system and more particularly to an automatic focus adjusting system wherein the focus adjustment is automatically turned off when the object or shooting conditions are not suitable for automatic adjustment. For instance, conditions of low contrast and/or high density of similar subject matter with a deep field of view present difficulties to automatic focusing. Of the many devices for adjusting focus automatically, each has its functional limits. A few specially designed systems work for special purposes, but because of the aforesaid limitations errors can occur in adjusting focus or measuring the subject distance. One reason for such errors comes from the fact that the object to be focused upon is a gathering of several objects which are not placed within the same plane (at right angle with optical axis) and they are not at the same distance from the camera. A small object near the camera appears the same size as a large object which is far away to automatic focus adjusting devices. The distance to which the objective lens should be focused is not obtainable and confusion results because in such devices the focusing is done by comparing the light from the several objects. Similarly, such devices cannot focus the lens when the amount of light is insufficient or when the object has low contrast or little or no difference in contrast.

Improvements are continuously being made to optical instruments such as cameras having a focusable objective lens. One of the more recent series of improvements is an automatic focusing system for adjusting the focus of the lens to an object distance corresponding to the distance of the camera to remote subjects in the field of view of that lens. Typically, an automatic focusing system may use the principle of spatial image correlation wherein a scene imaged by a first auxiliary optical system is scanned by a sensor and the image therefrom is correlated electronically by another sensor with an image from a fixed auxiliary optical system. Such an automatic focusing system has electronics for evaluating the light bundles from images passed through those optical systems and impinging on sensor arrays. Electronics are used to control power for a motor for driving the focusing cell of an objective lens in accordance with the relationship of the images transmitted by the optical systems. Focus of the objective lens occurs when the images from the optical systems are coincident; under such conditions the position of the scanning optical system is related to the position of the objective lens.

Certain of the automatic focusing systems, as described in recently issued United States patents, can be mass produced, are not unduly complex, bulky, and expensive, and are reliable for use in optical instruments or cameras for the mass market. Such systems include a scanning means, which moves an optical axis to sweep an image across a light sensitive array, and which is connected with another similar array of a distance detector. One of the optical axes is fixed relative to the rangefinder and camera lens and the other is moveable so as to scan along the other optical axis. An automatic rangefinder of the type generally described in U.S. Pat. No. 4,002,899 assigned to Honeywell, Inc. and called the Honeywell Visitronics module responds to the two optical systems that bring light from the subject to a detector having a pair of photo sensitive arrays. The module is responsive to the fact that the axes of the optical systems are aligned with one another and directed toward the same subject. Such alignment causes the detector to generate a peak pulse which pulse can be used to adjust the focus of the camera lens. Rangefinding is accomplished by triangulation and comparison of the image from the fixed axis with the image from the scanning axis. By means of suitable electronic circuitry the peak signal can be converted to a control signal for the focusing motor.

SUMMARY OF THE INVENTION

The present invention is designed to compensate for the difficulties of low contrast and complex scenes by detecting unsuitable conditions (for automatic focus adjusting) and providing a warning and correction. Such systems can handle several peak pulses per scan cycle, but are unable to analyze a great number of peak pulses per scan (crowded field of view) or no peak pulses (low or no contrast situations). Under such circumstances the module issues irregular or error signals which cause the lens to be automatically adjusted to a selected fixed focal position as predetermined manually by the user. Electronic circuitry constantly monitors the signals to determine whether to automatically focus or not. The electronic circuitry is provided for counting and storing data related to the conditions of the scene to be photographed and for directing the operation of the automatic focusing system in accordance therewith. Such circuitry includes presetting circuits for manually adjusting the controlled operation of the camera when the automatic focusing is not properly useable.

DETAILED DESCRIPTION OF THE DRAWINGS

Figure 1:
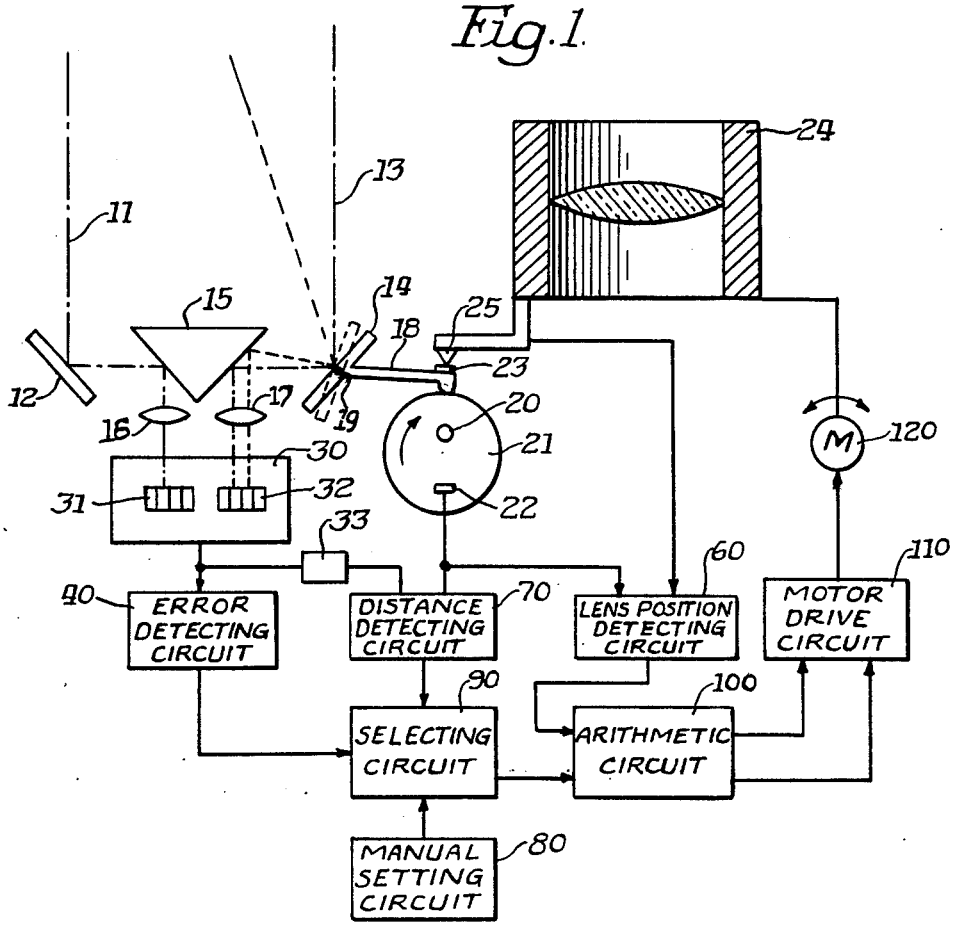
FIG. 1 shows a schematic diagram of an automatic focusing system and the electronic control circuitry of the present invention.
Figure 2:
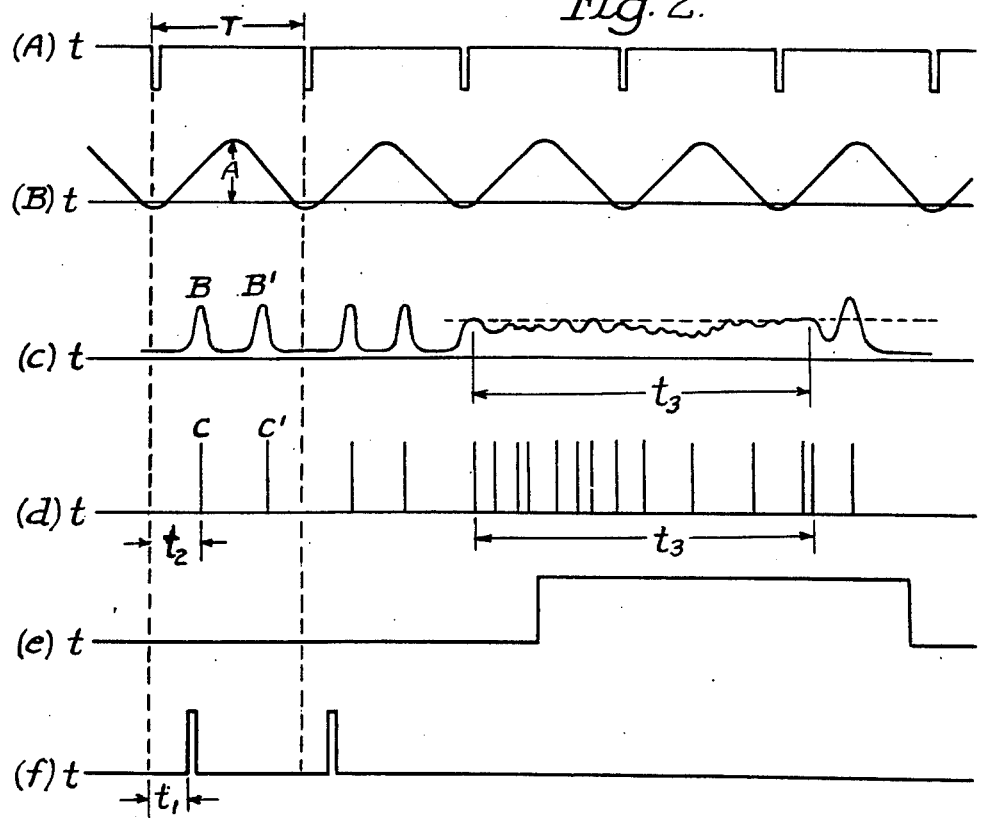
FIG. 2 shows time versus pulse waveform diagrams for the signals which are fed to the electronic control circuits in the present invention.

FIG. 1 shows an example of the present invention which includes an error or irregular signal detecting device. As is common with automatic focus adjusting systems, this one has two substantially identical optical systems 11 and 13, and optical system 11 has a fixed distance measuring mirror or sensor 12 and optical system 13 has movable (scanning) distance measuring mirror or sensor 14. Through scanning mirror 14, prism 15 and lens 17 the objective image is led through optical system 11 to a plurality of photoconductive elements 31 on an optical detector 30. Through fixed mirror or sensor 12, prism 15 and lens 16, an objective image is led through optical system 13. Optical detector 30 has a corresponding plurality of photoconductive elements 32. Elements 32 receive the image from system 13. The scanning mirror 14 is supported on an arm 18 which pivots about axis 19. Arm 18 is in contact with an eccentric cam 21 carried on axis 20 and driven by a motor (not shown). Arm 18 is oscillated by the rotation of eccentric cam 21 such that sensor mirror 14 oscillates to scan about axis 19. A contact 22 is carried on the face of the eccentric cam 21 for generating a reference signal once per revolution. This reference pulse is generated with each cycle T as shown in FIG. 2(a), and is applied as an input signal to a distance detecting circuit 70 and position detecting circuit 60. On the side of arm 18 opposite to the side which contacts eccentric cam 21, a contact 23 is positioned in alignment with a contact 25 carried upon lens barrel 24. Contacts 23 and 25 generate a lens position signal. Lens 24 is moved along its optical axis for focusing adjustment in accordance with the distance between camera and object. The lens position signal is determinable as it is generated at a time $t_2$ which is different from the timing of the reference signal. The timing of the reference signal is adjustable by moving the contact 22 relative to cam 21. The scanning of mirror 14 is shown as waveform in FIG. 2(b) with cycle T and amplitude A. The scanning of the distance measuring mirror 14 transmits an optical image to photoconductive element 32 that varies with time. Signals B and B' are generated when the two optical images of object to be focused are brought through the two optical systems 11 and 13 and coincide in light distribution. Signals B and B' correspond to the forward and return scanning correlations respectively and are shown in FIG. 2(c) during scanning cycle T. Signals B and B' are shaped to pulse waveform C and C' through waveform shape circuit 33 for application to a distance detecting circuit 70. By determining the timing difference between the reference signal and the pulse and the reference signal and the lens position signal, the lens focus position can be readjusted and corrected until there is no difference between image distance and the lens focus setting.

An error detecting circuit 40 is used to recognize irregular signals as errors (as shown $t_3$ in FIG. 2(c) and (d)). Irregular signals are those which are caused by low contrast or complex subject and which result in output signals from the optical detector 30 that have no clearly defined peaks or too many small peaks. Error detecting circuit 40 includes an operational amplifier 41 which receives the signal from the optical detector 30 and receives a predetermined threshold voltage from a variable resistor 42. The output of switch 22 and operational amplifier 41 is received by a flipflop circuit 43. Signals from switch 22 and amplifier 41 are arranged to set and reset the flipflop 43. The signal from switch 22 sets flipflop 43 and the output from the operational amplifier 41 resets flipflop 43. During each scanning cycle T of scanning mirror or sensor 14 the reference signal sets the flipflop 43 but it is reset by the output pulse from operational amplifier 41 only when the signal from optical detector 30 exceeds a predetermined voltage started by a variable resistor 42. A counter 44 is started by the output of flipflop 43 and is reset by the output of operational amplifier 41, thus the number of reference pulses passing through AND circuit 45 during the time when the flipflop 43 is set and reset is counted. Another flipflop 46 is connected to the output of counter 44 in order to store the count therefrom while the next cycle is input to counter 44.

The count from flipflop 46 of the error detecting circuit 40 operates when a regular signal is fed from optical detector 30. Such a signal causes the flipflop 43 to be reset by the output from operational amplifier 41 after each modifier (wave shaped) optical detector signal (C or C') thus none of the output is applied to the counter 44 and the counter 44 does not begin to count, the flipflop 43 is not set and no signal is fed to flipflop 43 output. When, however, an irregular signal or error is detected, flipflop 43 is set by the reference signal but is not reset since the voltage of an irregular signal does not reach the preset voltage of the variable resistor 42. Consequently, the reference signal is counted by counter 44 via the AND circuit 45 and when the number of the count reaches a preset value counter 44 sets flipflop 46 thus feeding the error signal to output 47. When the irregular signal again becomes regular such that the count of counter 44 does not reach the preset value, the regular signal resets flipflop 43. As explained more fully below, flipflop 46 is not set; but this condition does not mean that the error signal is instantly cleared since flipflop 46 still remains in a set state until a reset signal is received from the counter 49.

The error detecting circuit 40 also includes a timer 48 and counter 49 connected through AND circuits 50 and 51 to release (clear) the error warning condition. As the error signal output is generated from flipflop 46, it is fed to one of the two inputs of the AND circuit 50 but if a regular signal occurs (having the preset voltage as set by the variable resistor 42) the output from the operational amplifier 41 is then directed by invertor 52 to start timer 48. That output of operational amplifier 41 through timer 48 is counted by counter 49 to a preset number. When the number counted reaches the preset count, flipflop 46 is reset by the output from the counter 49 and the error signal is cleared. A preset count set by circuit 50 is compared with the output of flipflop 46. Therefore, the handling of the error signal is held constant for a pre-determined period such that the actual changing back to automatic focus is delayed as shown in FIG. 2(e).

Such delay prevents frequent changes from auto focus mode to the error condition described above and vice versa, and makes operation more stable. As described above, circuit 40 checks for error, but that circuit may be simplified by the use of a simple counter to count the number of coincidence pulses in a full scan cycle. If the number of coincidence pulses in a full scan cycle is less than 2, or more than 3, then the condition is judged as error.

Figure 3:
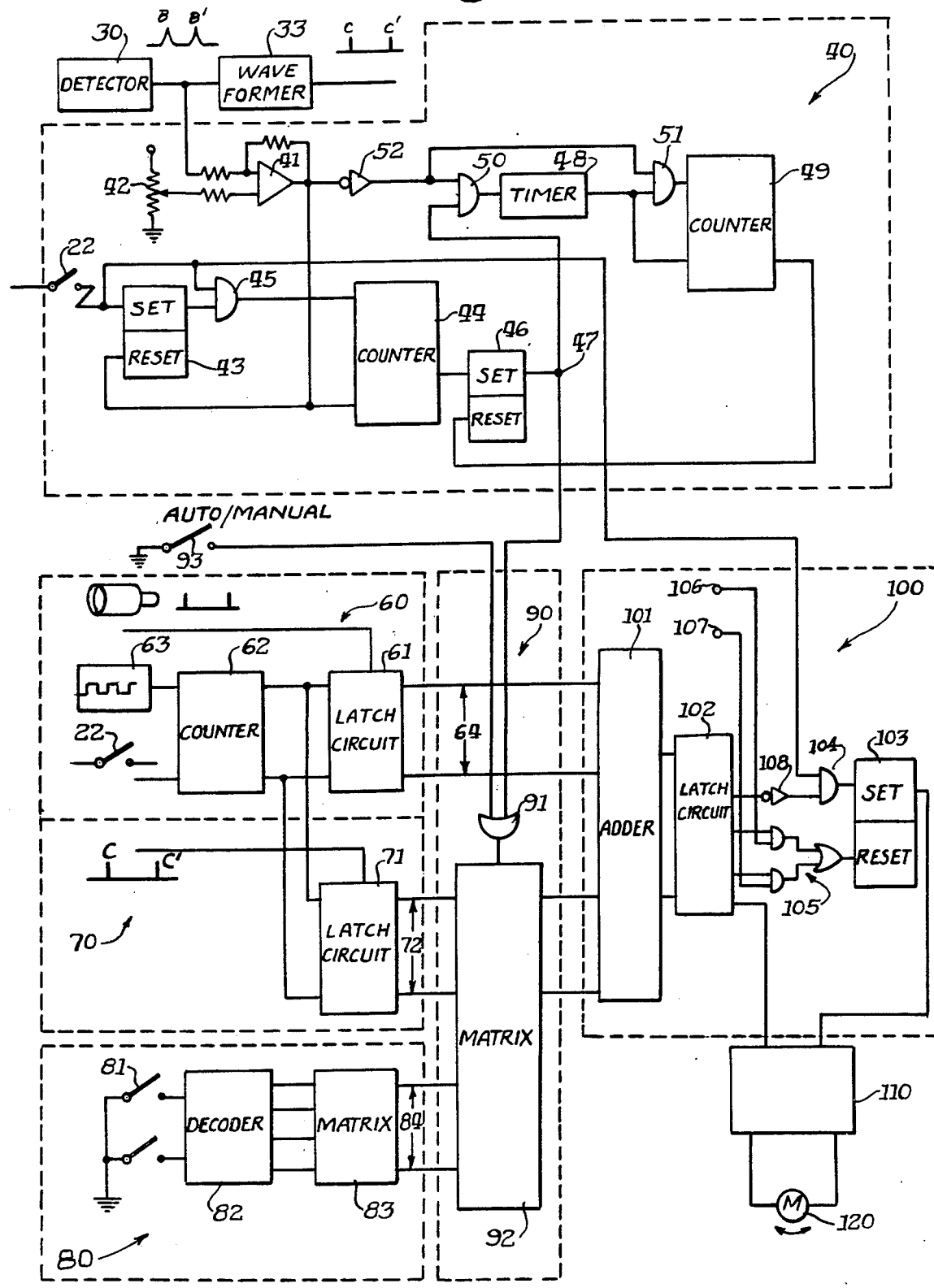
FIG. 3 shows a detailed block diagram of the various electronic control circuits and their interrelated components.

The details of the position detecting circuit 60 are shown in FIG. 3; they include latch circuit 61 connected to the output of counter 62. Counter 62 counts at a frequency established by a clock oscillator 63 and counter 62 is set and begins counting when the signal from the contacts 23 and 25 is received. Counter 62 is reset by the reference signal of switch 22 thus counting at the clock frequency from clock oscillator 63 for that given interval. That count is fed to latch circuit 61. The time interval between the reference signal and the lens position signal is the output information bit 64 from the latch circuit 61.

The distance detecting circuit 70 has its latch circuit 71 which is set by the distance signal from optical detector 30 and time count of counter 62 both of which are fed to the latch circuit 71. Consequently, the time interval between reference signal 22 and distance signal is the output information bit 72 from latch circuit 71. A manual setting circuit 80 and selecting circuit 90 are provided to permit the operator to set the automatic focus adjusting system (e.g. film speed, focal length, f-stop number etc.). The manual setting circuit 80 includes a manual setting switch 81, a decoder 82 and a matrix 83. The signal from the manual setting switch is fed to the decoder 82 for conversion to decade. Distance data 84, as preset manually, is put through the matrix 83 to correspond with the distance data of the distance detecting circuit 70. Selecting circuit 90 includes an OR circuit 91 and a matrix 92 for evaluating signals from the auto/manual selecting switch 93 and from the error detecting circuit 40, both of which are inputs for the OR circuit 91. In the circuit 90 the auto/manual selecting switch 93 is closed connecting that circuit and its signal from the OR circuit 91 to matrix 92 thereby changing the distance data information bit 72 of latch circuit 71 to the distance data information bit 84 (preset manually and transmitted through matrix 83) as output from matrix 92 and labeled bit 84.

An arithmetic circuit 100 is provided for adding the data of the automatic focus adjusting system. The arithmetic circuit 100 is constructed with an adder 101, a latch circuit 102 and a flipflop 103. Adder 101 compares the lens position signal 64 with the distance data from the selecting circuit 90 and the result is stored in latch circuit 102 after subtraction. The output from the latch circuit 102 is input for AND circuit 104 by means of inverter 108 which reverses direction of the output. The reference signal from switch 22 is the other input for AND circuit 104. The output from the latch circuit 102 is fed to AND circuit 104 to set flipflop 103. The output of flipflop 103 is fed to the motor drive circuit 110 for driving lens 24 by a motor 120. The output has the proper polarity which corresponds to the direction of rotation for motor 120 which is necessary to move the lens 14 in or out as required. The arithmetic circuit 100 has a logic OR circuit 105 to which a reset signal is fed from either terminal 106 or 107 whereby flipflop 103 is reset stopping lens driving motor 120 when the output from the latch circuit 102 reaches some preset value. Two reset signals are available and can be selected according to the required focusing preciseness. More particularly, when the reset signal comes from terminal 106, flipflop 103 is not able to be reset if the output from the latch circuit 102 is small, but when the reset signal comes from terminal 107 flipflop 103 is resettable even if the output from the latch circuit 102 is large. The manual selection of which terminal provides a reset signal in accordance with the selected preciseness required for focus adjustment. If the output from latch circuit 102 is zero the objective lens 14 is in focus and the AND circuit 104 does not set flipflop 103.

In one example of the invention there is an error warning circuit next to the error detecting circuit 40 and the manual pre-determined focusing position can either be changed continuously or in steps. Therefore, the threshold for detecting errors is variable. As another alternate the time interval between detector signals B and B' is always ½T(cycle) when in focus, but the time interval between signal B and B' changes and can be used as a distance signal for the preset focus, e.g. the time interval between the last reference signal and signal coming from the optical detector 30 (B or B') can be used as the pre-determined lens positioning signal.

While the invention has been shown with a rangefinding automatic focusing device and a specific circuitry, the concept broadly includes any system to drive the focusable objective to a preset fixed focus when the conditions of light emanating from the subject are inadequate or incorrect for generating proper detector pulses. That is pulses are regular and distinct whereby the timing between successive signals can be determined. In its broader aspects the invention covers circuitry which can be applied to any automatic focusing device for sensing the pulses from the photo responsive detector and evaluating the quality of such signals.

As those skilled in the art will no doubt appreciate many changes, refinements and modifications can be made to the construction and execution of an automatic focusing compensation system and it is therefore contemplated that the claims which follow will cover all of the various combinations, permutations and arrangements that are possible.

What is claimed is:

1. For a camera having an adjustable exposure system, a focusable objective lens, and an automatic focusing system including a scanner optical system having a scanner means and a reference optical system wherein images of a remote subject are caused respectively to impinge on a detector means, the detector means generating an output signal representing the object distance of the subject when the images on the detector are coincident, and including means to compare and relate the orientation of said scanner system and the focus condition of the objective lens and means to set the lens opening in accordance with the available light from the subject, the improvement in a means to adjust the focus of the objective lens to the object distance comprising:
   reference means on said objective lens sensitive to variations in focus condition of said lens and for signaling the position of said lens,
   means supporting the scanner means for movement thereof,
   scanner driver means for driving said scanner means oscillatably,
   means on said scanner supporting means for engagement with said objective lens focus condition reference means for periodically signaling the position of said supporting means during its oscillation,
   a first control means connected to said lens for driving said lens in accordance with a predetermined setting when said detector signal is irregular such that said focusable lens is adjusted to a fixed focus position in accordance with said setting,
   a second control means for driving said lens in accordance with the compared difference between the timing of said periodic signal, said detector signal, and said lens position signal, and
   electronic circuit means connected to said detector means for monitoring the frequency of the signals therefrom and for comparing said frequency to a predetermined threshold for automatically transmitting a control signal to said first or second control means in accordance with the detector signal condition.

2. The system of claim 1 wherein said electronic circuit means includes an operational amplifier for comparing a predetermined voltage with said detector signal for determining whether said first or second control means will be used whereby said predetermined voltage is the threshold across which said detector signals are considered regular.

3. The system of claim 1 wherein said predetermined setting is externally set by the operator to precondition the camera automatic focus system in accordance with the light and focal conditions available to the camera.

4. An automatic focus adjusting apparatus for a camera comprising:
   a focusing lens means to sharpen the subject image at the film plane;
   a scanning optical system for gathering light from predetermined portions of the field of view;

a reference optical system for gathering light from predetermined part of the field of view;

interconnecting means between said lens means and said scanning system for comparing the field of scan to the position of said lens means;

detector means responsive to gathered light for emitting a series of signals, the timing of which is definitive of the distance from the apparatus to the subject;

a scanning system position indicating means associated with said scanning system for defining the direction of scan of said system by timed signals indicative of the period of the scan;

a threshold means for counting said detector signals and in response to adjustments of said camera directing said detector to electronic circuitry;

a first electronic circuitry connected for receiving said detector signals from said threshold means when said signals are irregular and for driving said lens to a fixed focus position;

a second electronic circuitry connected to said threshold means for receiving regular detector signals and signals from said scanning position means and for comparing same to obtain a control input for automatically focusing said lens.

* * * * *